US007297930B2

(12) United States Patent
Defosse

(10) Patent No.: US 7,297,930 B2
(45) Date of Patent: Nov. 20, 2007

(54) DEVICE FOR MEASURING WIDTH BY LIGHT ATTENUATION DIFFERENCE

(75) Inventor: Sébastien Defosse, Le Plessis Robinson (FR)

(73) Assignee: Neopost Technologies, Bagneux (FR)

( * ) Notice: Subject to any disclaimer, the term of this patent is extended or adjusted under 35 U.S.C. 154(b) by 4 days.

(21) Appl. No.: 11/419,332

(22) Filed: May 19, 2006

(65) Prior Publication Data

US 2006/0261293 A1 Nov. 23, 2006

(30) Foreign Application Priority Data

May 20, 2005 (FR) .................................. 05 05095

(51) Int. Cl.
*G01V 8/10* (2006.01)

(52) U.S. Cl. ................... 250/222.1; 250/221; 356/634; 356/635; 209/576; 209/577; 209/586

(58) Field of Classification Search ................ 250/221, 250/222.1; 356/634, 635; 209/576, 577, 209/586; 702/170, 172; 705/400, 401, 406, 705/410
See application file for complete search history.

(56) References Cited

U.S. PATENT DOCUMENTS 5,236,072 A * 8/1993 Cargill ....................... 194/207
5,581,628 A * 12/1996 Nakamura et al. .......... 382/101
6,005,212 A * 12/1999 Van Lierde et al. ........ 209/586
6,006,210 A 12/1999 Freeman et al.
6,169,978 B1 1/2001 Lutz et al.
6,364,306 B1 * 4/2002 Kunde et al. .................. 271/2
6,650,397 B2 * 11/2003 Lucey et al. .................. 355/40

* cited by examiner

*Primary Examiner*—Davienne Monbleau
(74) *Attorney, Agent, or Firm*—Sughrue Mion, PLLC

(57) ABSTRACT

A device for measuring the width L of a mail item on the fly in a mail handling machine in which mail items are caused to move parallel to a reference wall, the device comprising: a detector device rendered active when the presence of a mail item passing over a plurality of levers is detected, said levers being disposed at a determined set pitch perpendicularly to said reference wall; an emitter device for emitting a light ray, which emitter device is disposed facing a first lever of said plurality; a receiver device for receiving said light ray; a measurement device for measuring the light intensity of the light ray received at said receiver device; and a processor device for computing a determined number y of levers activated by said mail item going past, on the basis of a comparison between said measurement of the received light intensity and an initial measurement of the light intensity of the light ray received at said receiver device when no mail items pass over said plurality of levers, the width L of a mail item being determined on the basis of the number y of levers activated by the mail item going past.

10 Claims, 3 Drawing Sheets

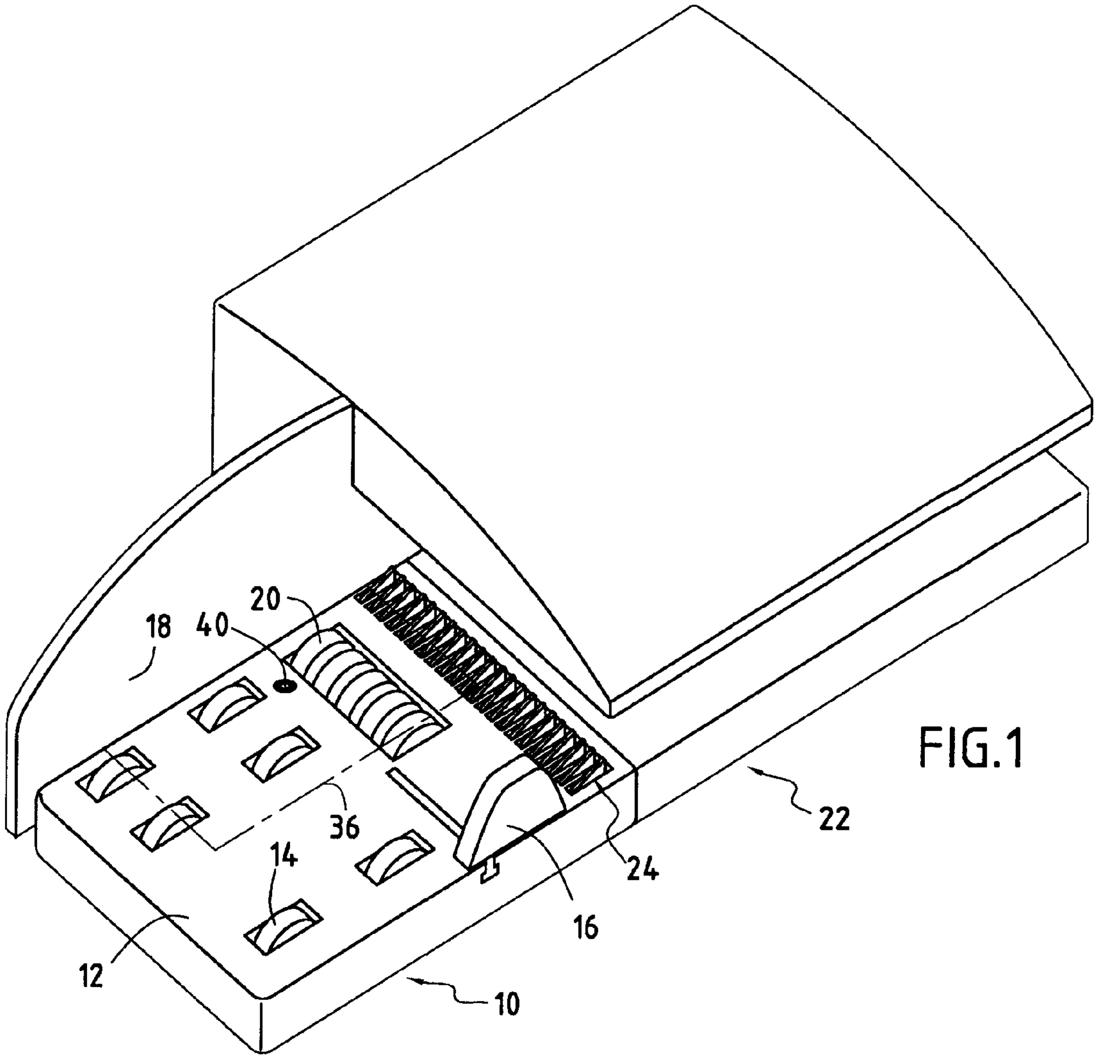
FIG.1
FIG.2
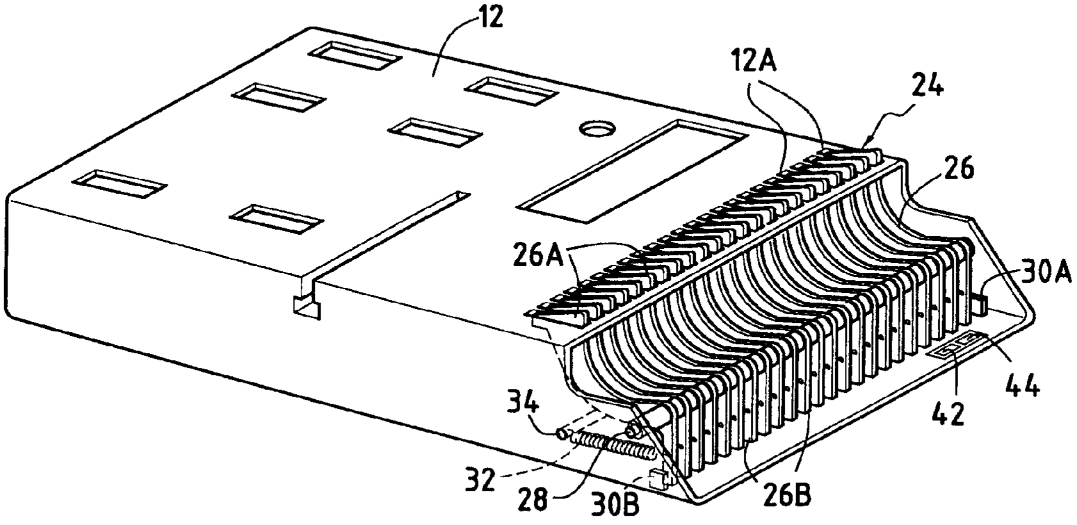

DEVICE FOR MEASURING WIDTH BY LIGHT ATTENUATION DIFFERENCE

TECHNICAL FIELD

The present invention relates to the field of mail handling. It relates more particularly to a device for measuring the width of a mail item conveyed through a franking or postage meter system.

PRIOR ART

A mail handling machine that is provided with a dimensional rating capability for postage pricing purposes is already known, e.g. from Document U.S. Pat. No. 6,006,210 (Pitney Bowes). In that machine, the width of the mail item is actually measured by means of strips of diodes. That apparently simple solution is however extremely costly in practice because it assumes that a plurality of very long strips are used.

A system for determining the dimensions of the mail item being conveyed in order to assign a precise amount of postage to it is also known from Patent Document U.S. Pat. No. 6,169,978 (Siemens) but that system is sophisticated.

OBJECTS AND DEFINITION OF THE INVENTION

An object of the present invention is thus to remedy the above-mentioned drawbacks and to make it possible to measure the width L of a mail item for franking purposes, without it being necessary to use complex or costly technical systems for taking such a measurement. An object of the invention is also to perform such measurement on the fly, i.e. while the mail item is being conveyed through the franking system and without said franking system being stopped.

These objects are achieved in accordance with the invention by means of a device for measuring the width L of a mail item on the fly in a mail handling machine in which mail items are caused to move parallel to a reference wall;

said device comprising: a detector device rendered active when the presence of a mail item passing over a plurality of levers is detected, said levers being disposed at a determined set pitch perpendicularly to said reference wall; an emitter device for emitting a light ray, which emitter device is disposed facing a first lever of said plurality; a receiver device for receiving said light ray; a measurement device for measuring the light intensity of the light ray received at said receiver device; and a processor device for computing a determined number y of levers activated by said mail item going past, on the basis of a comparison between said measurement of the received light intensity and an initial measurement of the light intensity of the light ray received at said receiver device when no mail items are passing over said plurality of levers.

Thus, a single emitter/receiver combination suffices for this structure that is formed around a plurality of mechanical levers in order to determine the width of a mail item with sufficient accuracy and, whenever its weight and optionally its length and its thickness are known, in order to compute the amount of postage with which it should be franked.

The device further comprises a device for determining the width L of a mail item on the basis of said determined number y of levers activated by said mail item going past.

Preferably, said measurement device for measuring the light intensity determines a ratio between the received light intensity and a predetermined initial light intensity.

Preferably, each lever is hinged to a common shaft mounted transversely relative to the direction of movement of the mail items and secured at both of its ends to a frame of the mail handling machine.

Preferably, each hinged lever has a first end portion designed to pass through an opening in a deck of the mail handling machine, and a second end portion that, in a rest position corresponding to no mail items passing over said plurality of levers, is designed to find itself in the path of the light ray transmitted between said emitter device and said receiver device.

A first end of a resilient element is fastened between said second end portion and said pivot axis, the other end of said resilient element being secured to the frame.

The present invention also provides a method of measuring the width L of a mail item in a mail handling machine through which the mail items are caused to travel parallel to a reference wall;

said method comprising the following steps: detecting the presence of a mail item passing over a plurality of levers disposed at a determined set pitch perpendicularly to said reference wall; detecting at a receiver reception of a light ray emitted by an emitter disposed facing a first lever of said plurality; measuring the light intensity of the light ray received at said receiver; and computing a determined number y of levers activated by said mail item going past, on the basis of a comparison between said measurement of the received light intensity and an initial measurement of the light intensity of the light ray received at said receiver device when no mail items pass over said plurality of levers.

In an advantageous implementation, said detection of the presence of a mail item is performed by continuously computing the light intensity received at said receiver, the variation of said intensity relative to a reference intensity being characteristic of the presence of a mail item.

The width L of a mail item is then determined on the basis of said determined number y of levers activated by said mail item going past.

The present invention also provides any mail handling machine including a measurement device as mentioned above for measuring the width L of a mail item on the fly.

BRIEF DESCRIPTION OF THE DRAWINGS

Other characteristics and advantages of the present invention appear from the following description of particular embodiments given by way of example and with reference to the accompanying drawings, in which:

FIG. 1 is a perspective view of a mail handling machine incorporating a device of the invention for measuring the width of a mail item;

FIG. 2 is a detail view of the measurement device of FIG. 1;

DETAILED DESCRIPTION OF PREFERRED EMBODIMENTS

Figure 3:
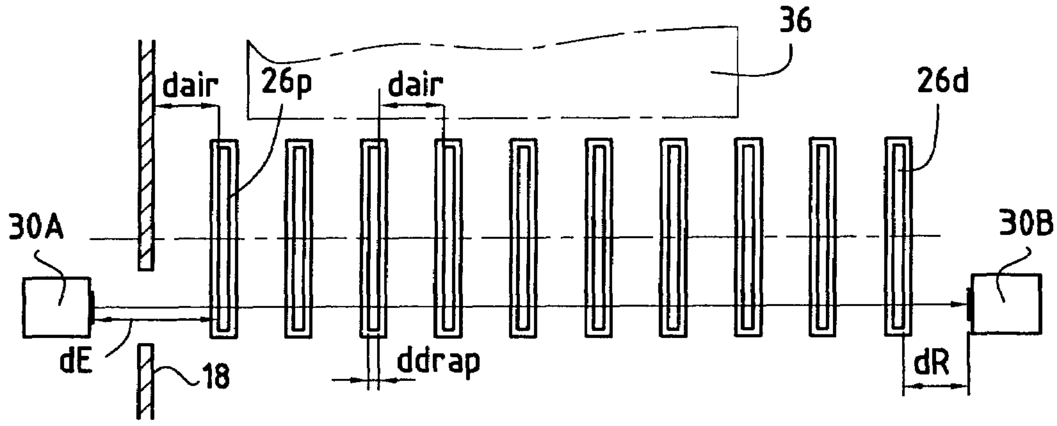
FIGS. 3 and 4 are diagrammatic views of the device of FIG. 2 in two different embodiments, respectively in a rest position and in an activation position.

Mail items are rated for postage pricing purposes on the basis of mail item weight and of mail item size (thickness, envelope length, and envelope width). It is a question either of verifying that the dimensions of the envelope are greater than thresholds, or of verifying that the envelope length to envelope width ratio lies within two limits (e.g. 1.3<R<2.5 for the USA, and R<square root of 2 for Germany).

In order to assign the appropriate postage price to each mail item in a non-uniform batch, a measurement device that measures the weight and the dimensions of each envelope and that transmits the resulting information to a postage price computer is disposed upstream from the franking module of a mail handling machine, in general at the feed module or "feeder" thereof. The mail item can also be weighed separately by means of an independent weigh module disposed on the path along which the envelopes are conveyed, e.g. between the feeder and the franking module.

FIG. 1 shows a mail handling machine incorporating a mechanical device of the invention for measuring the width L of a mail item. The mail handling machine conventionally comprises, from upstream to downstream (in the direction in which the mail items travel through the machine): a feed module 10 provided with a deck 12 on which the mail items to be franked are placed in a compact stack that can be uniform or non-uniform (depending on whether or not the mail items are of the same size); drive rollers 14 and jogger means (advantageously side jogger means 16 and/or back jogger means) for jogging the mail items against a reference wall or "envelope guide" 18; a selector module (of which only the bottom rollers 20 are shown) for extracting the mail items to be franked one by one from the bottom of the stack; and a franking module 22 for printing a postage imprint on the mail item selected in this way.

In accordance with the invention, the machine further comprises a device 24 for measuring the width of each mail item, which device is advantageously disposed at the outlet of the selector module, and comprises a plurality of retractable members 26 distributed uniformly along a line perpendicular to the reference wall 18 and preferably over the entire width of the mail handling machine. Each retractable member is in the form of a lever 26 hinged to a common shaft 28 mounted transversely relative to the direction of movement of the mail items and secured at both of its ends to the frame of the mail handling machine, and preferably to the deck of the feed module as shown in FIG. 2.

Each hinged lever can, for example, be generally swan-neck shaped and has a first end portion that is, for example, triangular 26A designed to pass through an opening 12A in the deck 12, and a second end portion 26B that is opposite to the first end portion about the pivot axis of the common shaft 28, said second end portion being designed so that, in a rest position corresponding to absence of any mail item, it intercepts light rays, i.e. it lies in the path of the light rays transmitted from a light emitter device (emitter 30A), typically a light-emitting diode, to a light receiver device 30B for receiving the transmitted light rays.

A first end of at least one resilient element 32 is fastened between said second end portion and the pivot axis along which the common shaft extends, the other end of said at least one resilient element being secured to the frame, e.g. by being fastened to a support bar 34 mounted transversely in the frame. The resilient element, e.g. a spring, is adjusted so that it does not hinder movement of the mail items through the machine, and thus so as to enable the lever 26 both to retract merely under the weight of a mail item going past it and also to return to its initial position once the mail item has gone past.

The levers are spaced apart at an identical, set pitch determined such that it is possible to discriminate, with no possible error, between the various postal formats handled by the mail handling machine. With reference to the postal standards applicable in Europe, a spacing of 10 millimeters (mm), for example, makes it possible to separate, with no difficulty, the formats C6, B6, and E6 whose envelope widths are respectively 114 mm, 125 mm, and 140 mm. Since the mean width of a mail handling machine in Europe is commonly 250 mm (in order to enable envelopes of C4 format to pass through in landscape mode or envelopes of C5 format to pass through in portrait mode), it is decided, in this example, to dispose 25 levers across the machine. Naturally, these numbers and widths are given merely by way of illustration, and any other combination can naturally be imagined depending on the type of mail handled or on the type of postal standards implemented, e.g. American postal standards.

FIG. 3 diagrammatically shows how the levers 26 are disposed in their initial, rest positions when no mail items are going past, and in a preferred embodiment of the invention. In this embodiment, measurement of the width of a mail item is based on the attenuation of the intensity of the emitted light as a function of the medium through which said light passes, the light propagating in a direct line from the emitter 30A to the receiver 30B.

Each lever is made of the same material which has a determined damping coefficient $\mu^{drap}$ that is preferably very different from the damping coefficient of air $\mu^{air}$, and presents a determined width $d^{drap}$. The distance between two levers $d^{air}$ is known and set on constructing the machine as a function of the applicable postal standards and of the characteristics of the envelopes handled. A first lever 26*p* is disposed at the distance $d^{air}$ from the reference wall 18. Similarly, the distance $d^E$ between the emitter 30A and the first lever 26*p* and the distance $d^4$ between the last lever 26*d* and the receiver are set by construction.

If Ie0 is the constant light intensity emitted by the emitter, it is possible to determine the light intensity received at the receiver Ir0 after it has passed through all of the levers, the determined number of which is x. The following equation is easily obtained:

$$Ir0=Ie0*\exp[-d^E\mu^{air}]*\exp[-xd^{drap}\mu^{drap}]*\exp[(x-1)d^{air}\mu^{air}]*\exp[-d^R\mu^{air}]$$

Figure 4:
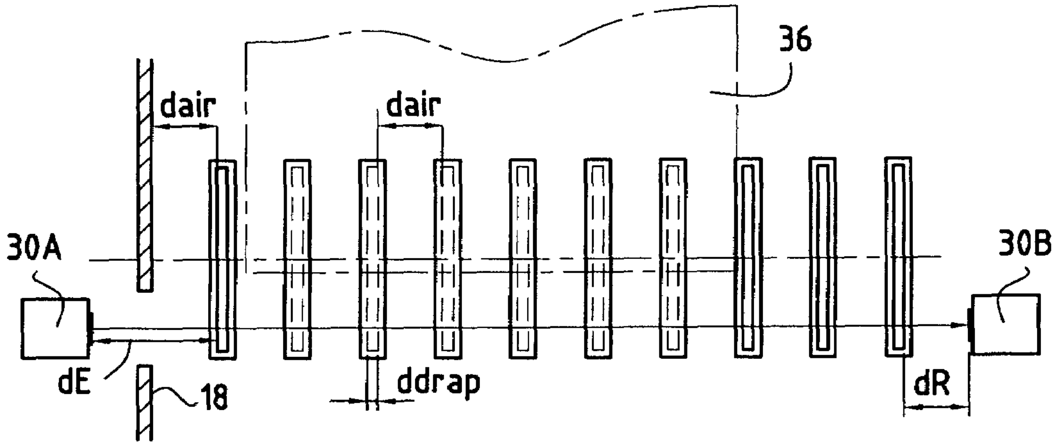

While it is going through the mail handling machine, a mail item necessarily goes past the line of levers, and thus activates, as it goes past, a determined number y of levers corresponding to its width. FIG. 4 shows how the levers are disposed facing the emitter and the receiver after some of them have been activated by a mail item 36.

The light intensity received at the receiver Iry after passing through the non-activated levers only is thus given by the following equation:

$$Iry=Ie0*\exp[-d^E\mu^{air}]*\exp[-d^{drap}\mu^{drap}(x-y))*\exp[-d^{drap}\mu^{air}y]*\exp[-d^{air}\mu^{air}(x-1)]*\exp[-d^R\mu^{air}]$$

i.e.:

$$Iry=Ir0*\exp[y(\mu^{drap}-\mu^{air})d^{drap}]$$

from which it is possible to extract the number y of levers activated by the mail item in question:

$$y=[In(Iry/Ir0]/[d^{drap}(\mu^{drap}-\mu^{air})]$$

It can be noted that $d^E$, $d^R$ and $d^{air}$ are not involved in the computation of y, thereby facilitating determination of the width L of the mail item (the dimensional tolerances on those values are not taken into consideration for the result of the computation), said width then being given by the following inequality:

$$(y-2)*d^{drap}+(y-1)*d^{air}<L\leq y*d^{drap}+(y+1)*d^{air}$$

The width L of a mail item is thus known ±1 pitch step-size (pitch step-size=$d^{drap}$+$d^{air}$)

It should also be noted that it is not necessary to jog the mail item against the reference wall 18. It is merely necessary for said mail item to go along said wall perpendicularly thereto.

Figure 5:
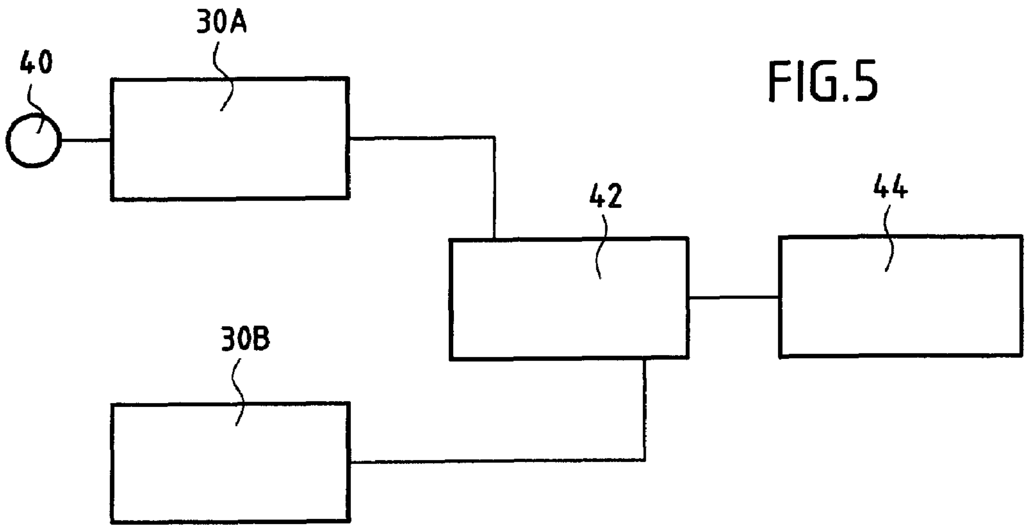
FIG. 5 is a block diagram showing the main elements of an example of a processing circuit that can be incorporated into the device of the invention.

With reference to FIG. 5, a description is given below of an example of a processing circuit that can be implemented for the measurement device of the invention.

Firstly, it is a question of detecting the presence of a mail item ready for franking. For this purpose, the device can include a mail item leading edge detector device 40 disposed on the mail item conveyor path, preferably slightly downstream from the line or levers in order to guarantee that, when they are activated by a mail item, a front portion of said mail item must have already crossed said line and has thus necessarily activated some of the levers 26. The term "activation" is used herein to designate the state of the detector device when a mail item passes in the vicinity thereof and, for example, for an optical sensor, when a mail item interrupts a light beam emitted by the sensor.

It should however be noted that the detector device for detecting the presence of a mail item 40 can also be of the software type and can consist, for example, in continuously computing the light intensity received at the receiver Iry, the variation in said intensity relative to the light intensity Ir0 received at the receiver in the absence of activation of the levers necessarily indicating that the levers have been activated and thus that a mail item is present at the inlet of the franking module.

When the sensor 40 is of the mechanical type or of the optical type, activating it switches on the emitter 30A to which it is connected. Said emitter and the receiver 30B are also connected to a light intensity module 42 which measures the light intensity received after said activation and determines the ratio between said received light intensity and an initial light intensity received without any mail items going past and determined previously (in practice, during construction of the machine or while the machine is being calibrated), which intensity ratio is the intensity ratio from which, in accordance with the above-mentioned equation, a processor module 44, which is advantageously a microprocessor and which is connected to the outlet of the measurement module makes it possible inter alia to compute the number y of activated levers and to deduce therefrom the width L of the mail item. Depending on the hardware configuration imagined, the receiver might or might not incorporate the measurement module for measuring the received light intensity, and the ratio of the light intensities can be determined by hardware in said measurement module or by software in the processor module.

Figure 6:
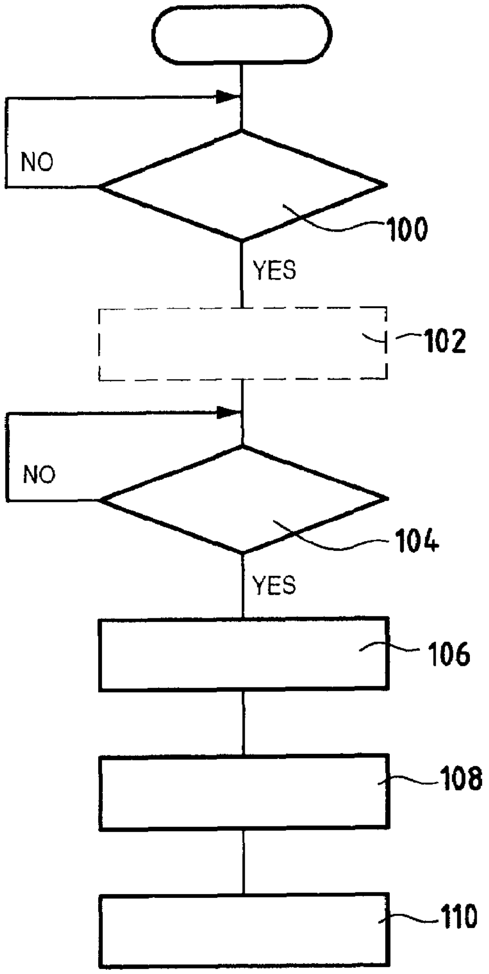
FIG. 6 is a flow chart showing an example of various steps implemented for measuring the width of a mail item on the fly in accordance with the invention.

An example of data-processing implemented in the above-mentioned circuit is explained below with reference to the flow chart in FIG. 6.

A test 100 examines whether a mail item is present (because, for example, the sensor 40 is activated). If the presence of a mail item is not detected, the processing returns to the inlet of said test 100. If the presence is confirmed, the processing goes to the step 102 for triggering the emitter 30A (naturally this step does not exist when presence is detected continuously, the emitter having been triggered much earlier). When a test 104 detects that a light signal has been received by the receiver 30B, the processing goes successively to the step 106 for measuring the received light intensity, to the step 108 for determining the ratio between said received light intensity and a predetermined initial intensity, and then to the step 110 of determining the number y of levers activated and the value L of the mail item. The process can then be started again for a new mail item with the emitter 30A being stopped or not being stopped after each measurement, depending on the type of the device implemented for performing the presence detection.

In order to overcome any measurement errors or slight skewing of the mail item, it should be noted that the measurement can be reiterated several times while the mail item is passing, a mean of the results then being taken after discarding the extreme values.

What is claimed is:

1. A device for measuring the width L of a mail item on the fly in a mail handling machine in which mail items are caused to move parallel to a reference wall;

said device comprising: a detector device rendered active when the presence of a mail item passing over a plurality of levers is detected, said levers being disposed at a determined set pitch perpendicularly to said reference wall; an emitter device for emitting a light ray, which emitter device is disposed facing a first lever of said plurality; a receiver device for receiving said light ray; a measurement device for measuring the light intensity of the light ray received at said receiver device; and a processor device for computing a determined number y of levers activated by said mail item going past, on the basis of a comparison between said measurement of the received light intensity and an initial measurement of the light intensity of the light ray received at said receiver device when no mail items pass over said plurality of levers.

2. A device according to claim 1, further comprising a device for determining the width L of a mail item on the basis of said determined number y of levers activated by said mail item going past.

3. A device according to claim 1, wherein said measurement device for measuring the light intensity determines a ratio between the received light intensity and a predetermined initial light intensity.

4. A device according to claim 1, wherein each lever is hinged to a common shaft mounted transversely relative to the direction of movement of the mail items and secured at both of its ends to a frame of the mail handling machine.

5. A device according to claim 4, wherein each hinged lever has a first end portion designed to pass through an opening in a deck of the mail handling machine, and a second end portion that, in a rest position corresponding to no mail items passing over said plurality of levers, is designed to find itself in the path of the light ray transmitted between said emitter device and said receiver device.

6. A device according to claim 5, wherein a first end of a resilient element is fastened between said second end portion and said pivot axis, the other end of said resilient element being secured to the frame.

7. A mail handling machine including a measurement device according to claim 1 for measuring the width L of a mail item on the fly.

8. A method of measuring the width L of a mail item in a mail handling machine through which the mail items are caused to travel parallel to a reference wall;

said method comprising the following steps: detecting the presence of a mail item passing over a plurality of levers disposed at a determined set pitch perpendicularly to said reference wall; detecting at a receiver reception of a light ray emitted by an emitter disposed facing a first lever of said plurality; measuring the light intensity of the light ray received at said receiver; and computing a determined number y of levers activated by said mail item going past, on the basis of a comparison between said measurement of the received light intensity and an initial measurement of the light intensity of the light ray received at said receiver device when no mail items pass over said plurality of levers.

9. A method according to claim 8, wherein said detection of the presence of a mail item is performed by continuously computing the light intensity received at said receiver, the variation of said intensity relative to a reference intensity being characteristic of the presence of a mail item.

10. A method according to claim 8, wherein the width L of a mail item is determined on the basis of said determined number y of levers activated by said mail item going past.

* * * * *